(No Model.) 2 Sheets—Sheet 1.

Z. B. COES.
TAPER TURNING TOOL FOR LATHES.

No. 535,486. Patented Mar. 12, 1895.

Witnesses:
E. R. Shipley.
M. S. Belden.

Zorester B. Coes
Inventor
by James W. See
Attorney (No Model.) 2 Sheets—Sheet 2.

Z. B. COES.
TAPER TURNING TOOL FOR LATHES.

No. 535,486. Patented Mar. 12, 1895.

Witnesses:
E. R. Shipley
M. S. Belden

Zorester B. Coes
Inventor
by James W. See
Attorney

UNITED STATES PATENT OFFICE.

ZORESTER B. COES, OF HAMILTON, OHIO, ASSIGNOR TO THE NILES TOOL WORKS COMPANY, OF SAME PLACE.

TAPER-TURNING TOOL FOR LATHES.

SPECIFICATION forming part of Letters Patent No. 535,486, dated March 12, 1895.

Application filed May 7, 1894. Serial No. 510,304. (No model.)

*To all whom it may concern:*

Be it known that I, ZORESTER B. COES, of Hamilton, Butler county, Ohio, have invented certain new and useful Improvements in Taper-Turning Tools for Lathes, (Case C,) of which the following is a specification.

This invention pertains to improvements in that class of devices designed for use in connection with lathes for the turning of tapers upon metal, the work being revolved while being acted upon by a stationary tool, the feeding motion being produced either by advancing the tool upon the work, or by advancing the work to the tool, the former method being the one chosen for exemplification.

In my improved system the cutting-tool and the back-rest are in the form of sliding jaws mounted and operating after the manner of the jaws in ordinary lathe chucks. Indeed, while the corresponding parts in my construction do not perform a true grasping office, like a chuck, their construction and movements are so analogous that I deem it not improper to employ the term chuck in describing my invention.

My invention will be readily understood from the following description taken in connection with the accompanying drawings, in which—

Figures 1, 4:
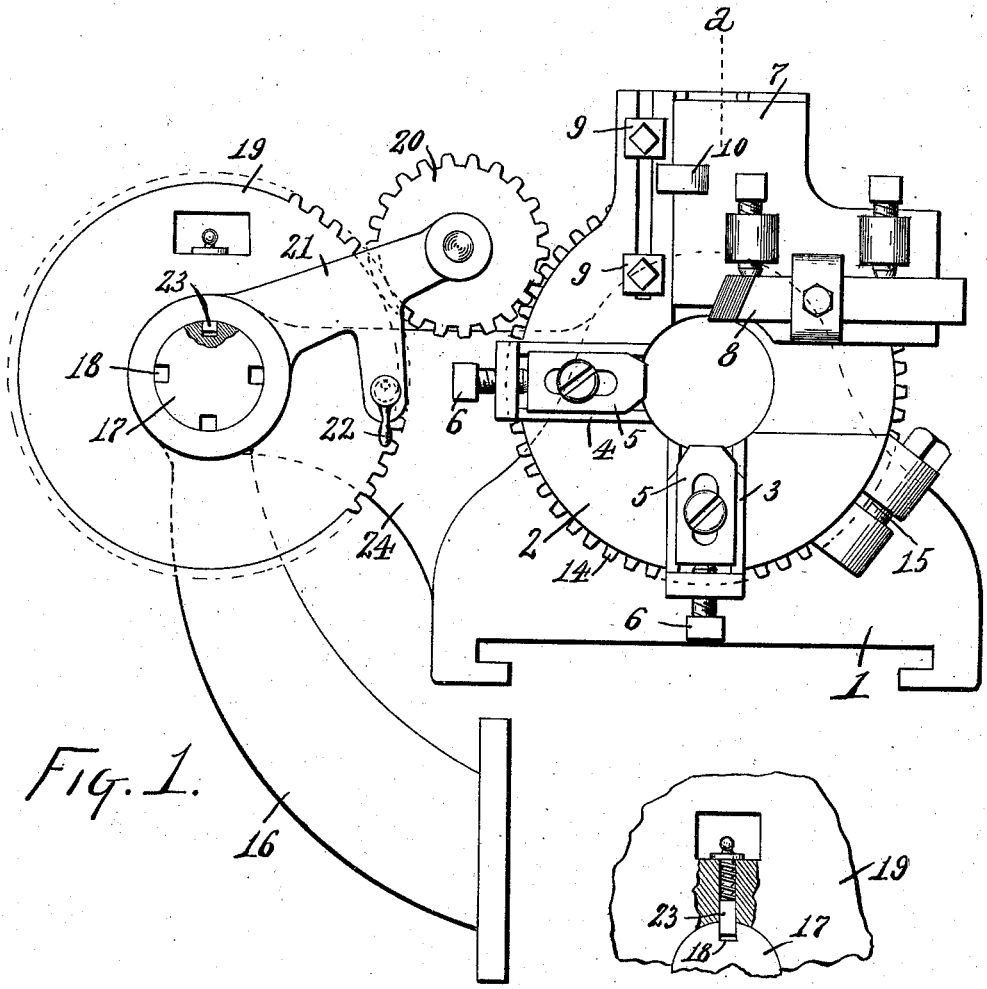
Figure 2:
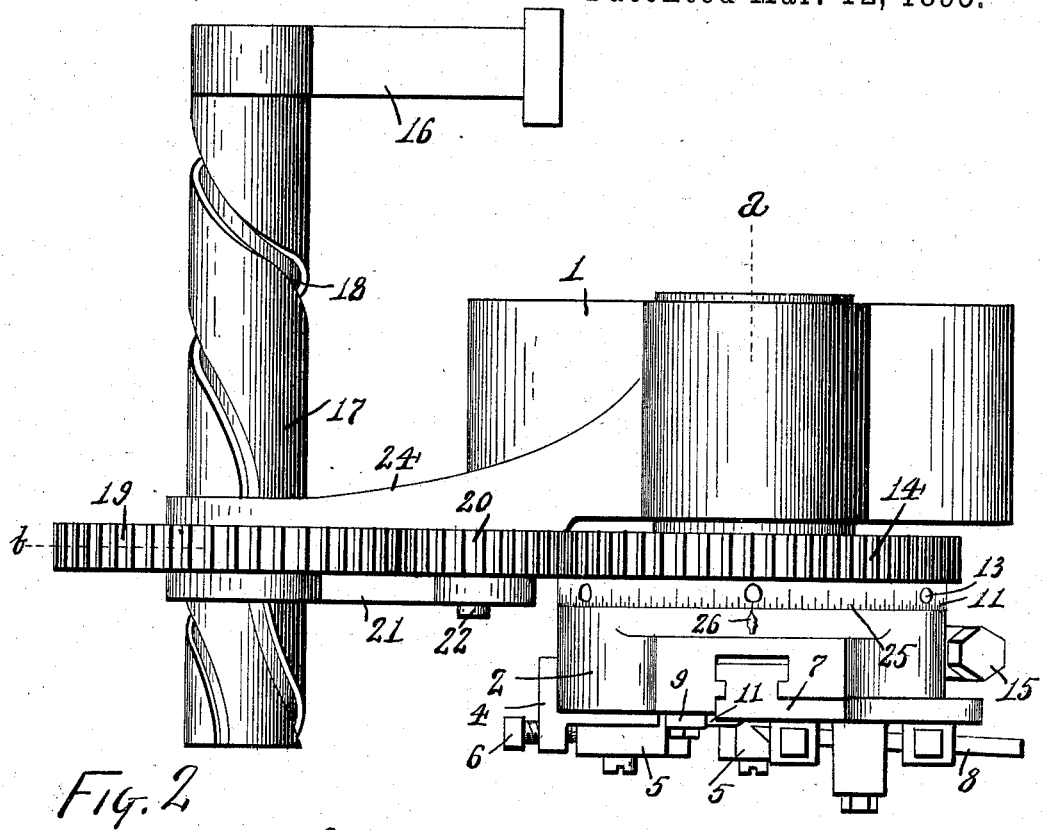
Figure 3:
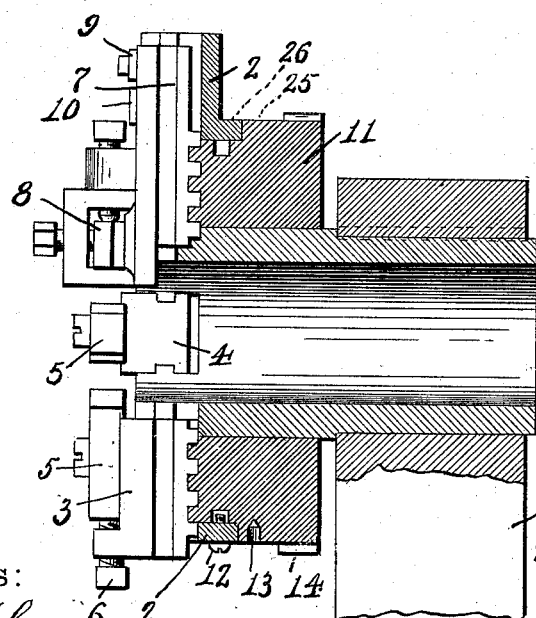

Figure 1, is a front elevation of my improved taper-turning tool, this view presenting that face of the structure which will present toward the head-stock of the lathe; Fig. 2, a plan of the same; Fig. 3, a vertical diametrical section in the plane of line *a*; and Fig. 4, a front elevation of a portion of gear 19, a part appearing in vertical section in the plane of line *b* of Fig. 2.

In the drawings, following Fig. 1 for the present:—1, indicates a support, to be arranged for sliding motion with reference to the head-stock upon a lathe, such support finding its equivalent in an ordinary lathe-carriage, or lathe tail-stock, or turret-slide of a turret-lathe; 2, a non-rotary chuck-body rigidly carried by this support with its axis coincident with the axis of the lathe, this chuck-body being provided with radial grooves for sliding jaws upon its front face; 3, a jaw fitted to slide radially in this chuck-body and toothed at its back to engage the face of a scroll-ring, after the manner of scroll-chucks; 4, a second jaw fitted to slide in the chuck-body at right angles to the first mentioned jaw; 5, a super jaw mounted for radial adjustment in each of the previously mentioned jaws; 6, adjusting-screws in the jaws 3 and 4 for adjusting the super jaws 5; 7, a third jaw disposed diametrically opposite jaw 3, this third jaw however being considerably enlarged to form a tool-holder; 8, a cutting-tool adjustably clamped in jaw 7 and presenting its cutting-point diametrically opposite jaw 3; 9, a pair of adjustable stops upon the face of the chuck-body to serve in adjustably limiting the inward and outward motion of tool-holding jaw 7 and, as the jaws are all connected together by the scroll which operates them, also the other jaws; 10, a stop-lug carried by jaw 7 and co-operating with the stops 9; 11, (Fig. 3) a scroll-ring mounted for rotation on the hub of the chuck-body to the rear of the jaws, the front face of this ring having a scroll thread to engage the teeth of the jaws, as in the case of ordinary scroll-chucks; 12, a screw in a portion of the chuck-body which completely encircles a portion of the scroll-ring, the point of this screw taking into a peripheral groove in the scroll-ring, this screw thus serving to prevent the retreat of the scroll-ring; 13, spanner-holes in the scroll-ring by means of which the ring may be turned by hand; 14, a gear fast to the scroll-ring; 15, a clamp-screw at a split in that portion of the chuck-body which encircles a portion of the scroll-ring, by means of which the scroll-ring can be more or less tightly clamped to the chuck-body; 16, a rigid arm to be secured to the lathe-bed or other support fixed with reference to the sliding support 1 which carries the chuck system; 17, a cylinder rigidly supported by the arm 16 with its axis parallel with that of the chuck; 18, longitudinal grooves in cylinder 17, these grooves being arranged in the form of true spirals for the production of tapered work and, in other cases, having forms irregular or otherwise suited to the contour of the work to be produced, there being as many of these grooves in the cylinder as is required or permissible; 19, a gear mounted on cylinder 17 and capable of sliding along the same under control of the sliding support 1 which carries the chuck system, this gear being in line with gear 14 on the scroll-ring; 20, an intermediate gear connecting the other two gears; 21, a pivoted arm carrying the intermediate gear and permitting that gear to be brought into active or idle position; 22, a cam for moving arm 21 to put gear 20 into engagement or disengagement; 23, a driving-pin or feather in gear 19, engaging one of the grooves in the cylinder and capable of being withdrawn from the groove so that the gear may be turned upon the cylinder to bring the pin to another selected groove; 24, an arm projecting rigidly from the sliding support 21 and engaging gear 19 to cause the gear system to move positively with the chuck system and slide lengthwise of the grooved cylinder; 25, a series of graduations on the periphery of the scroll-ring; and 26, an index carried by the chuck-body and operating with the graduations on the scroll-ring.

It will be obvious, without particular explanation, that as the chuck system is fed forward upon the work the scroll-ring will be forced to turn and thereby give equal inward or outward motion to all the jaws and it will also be obvious that if the controlling groove in the cylinder is a true spiral the radial movement of the jaws will be constant for each unit of longitudinal advance of the chuck system along the work, thus producing a true taper by the action of the cutting-tool, the other jaws forming a back-rest for the work. The cylinder will be provided with grooves of varying degrees of spirality corresponding with the degrees of taper desired to be produced. For the production of work having irregular contours, that is to say, neither tapering or cylindrical, grooves of an appropriate form will be provided in the cylinder. Controlling pin 23 may be readily shifted from one groove to another. Cam 22 permits the chuck system to be quickly freed from the control of the cylinder. The system of transmitting gearing shown is to be understood as merely exemplifying in character.

Super jaws 5 may be adjusted in their supporting jaws to compensate for unequal wear and their presence relieves their supporting jaws from wear and permits of ready renewal of the parts subject to wear.

Parts requiring tapers to be turned upon them also often require to have portions turned cylindrically and the present device offers excellent facilities for doing this work and securing uniform sizes in a multiplicity of pieces of work. Assume gear 20 to be out of engagement, the chuck-ring being therefore free to be turned by hand. Assume the cutting-tool and the super jaws to be properly set equi-distant from the axis of the chuck. The scroll-ring may be turned by hand to bring the cutting-tool and the super jaws inwardly into correspondence with some exact diameter desired to be produced upon a piece of cylindrical work. The inner one of stops 9 may then be set to gage this inward position of the jaws. The scroll-ring may then be turned to move the jaws outwardly to correspond with a second exact diameter desired to be produced upon the work, and the outer one of the jaws 9 may be set to gage this position. Then, in using the device the jaws may be moved clear in or clear out, as determined by the stops, and thus permit of the accurate production of cylindrically turned work of the two selected diameters. Assume, for instance, that pins are to be produced having a tapered body and cylindrical portions at each end. The stops 9 being set to suit the two cylindrical diameters, and pin 23 having been set to the appropriate groove in the cylinder 17, the small straight end of the pin may be turned a proper diameter and then gear 20 may be thrown into action and the taper turned and then the gear thrown out of action and the other straight portion turned, the scroll-ring being set by hand to proper size at the beginning of the taper in case the beginning of the taper should call for a different diameter from that of the cylindrical part of the work which preceded it. The cutting-tool and the jaws may be accurately set to a cylindrical plug of accurate size and the graduations 25 on the scroll-ring should read with reference to the pitch of the scroll and to standard units of measurement so that the diameter of the circle produced by the jaws can be read from the graduations. By this means, in connection with either cylindrical or tapered work, the scroll-ring may be quickly turned to position to produce the desired diameter of work.

I claim as my invention—

1. The combination, substantially as set forth, of a non-rotary chuck-body, a sliding support therefor, a tool-holding jaw and back-rest jaws carried by the chuck-body, a rotary part mounted on the chuck-body and adapted to move said jaws coincidently, and mechanism substantially as set forth for turning said rotary part in unison with the longitudinal movement of said sliding support.

2. The combination, substantially as set forth, of a sliding support, a non-rotary chuck-body carried thereby, a tool-holding jaw and back-rest jaws mounted in the chuck-body, a rotary scroll-ring mounted on the chuck-body and engaging the jaws, and mechanism for turning said scroll-ring in unison with the longitudinal motion of said sliding support.

3. The combination, substantially as set forth, of a sliding non-rotary chuck-body, a tool-holding jaw and back-rest jaws carried thereby, a rotary part mounted on the chuck-body and arranged to move said jaws coincidently, a fixed grooved cylinder disposed parallel with the axis of the chuck-body, and a gear engaging said grooved cylinder and connected with said rotary part and chuck-body so as to slide along said grooved cylinder as the chuck-body moves longitudinally of the work in hand.

4. The combination, substantially as set forth, of a sliding chuck-body, a tool-holding jaw carried thereby, a cylinder provided with a multiplicity of substantially spiral grooves and rigidly supported parallel with the axis of said chuck-body, and a gear mounted on said cylinder and carried by said sliding chuck-body and connected with said tool-holding jaw so that as the other parts mentioned move longitudinally with reference to said grooved cylinder said tool-holding jaw moves correspondingly to and from the axis of the chuck-body.

5. The combination, substantially as set forth, of a non-rotary chuck-body, a tool-holding jaw arranged to be moved radially therein, and provided with a stop-lug and adjustable stops to limit the inward and outward movements of said jaw, and adapted to be engaged alternatively by said stop-lug.

ZORESTER B. COES.

Witnesses:
SAM D. FITTON, Jr.,
J. W. SEE.